US009824275B2

(12) United States Patent
Lee et al.

(10) Patent No.: US 9,824,275 B2
(45) Date of Patent: Nov. 21, 2017

(54) UNMANNED AERIAL VEHICLE DETECTION METHOD AND UNMANNED AERIAL VEHICLE USING SAME

(71) Applicant: HON HAI PRECISION INDUSTRY CO., LTD., New Taipei (TW)

(72) Inventors: Hou-Hsien Lee, New Taipei (TW); Chang-Jung Lee, New Taipei (TW); Chih-Ping Lo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 131 days.

(21) Appl. No.: 14/814,868

(22) Filed: Jul. 31, 2015

(65) Prior Publication Data

US 2017/0032175 A1    Feb. 2, 2017

(51) Int. Cl.
| | | |
|---|---|---|
| *G01C 23/00* | (2006.01) | |
| *G06K 9/00* | (2006.01) | |
| *B64C 39/02* | (2006.01) | |
| *G06K 9/64* | (2006.01) | |
| *G01S 19/51* | (2010.01) | |

(52) U.S. Cl.
CPC .......... *G06K 9/0063* (2013.01); *B64C 39/024* (2013.01); *G01S 19/51* (2013.01); *G06K 9/00369* (2013.01); *G06K 9/64* (2013.01); *B64C 2201/123* (2013.01); *B64C 2201/127* (2013.01); *B64C 2201/145* (2013.01); *B64C 2201/146* (2013.01)

(58) Field of Classification Search
CPC .... G60K 9/0063; B64C 39/024; B64D 47/08; G01S 19/42; G06K 9/00362; G06K 9/64
See application file for complete search history.

(56) References Cited

U.S. PATENT DOCUMENTS

| | | | | |
|---|---|---|---|---|
| 9,367,067 B2* | 6/2016 | Gilmore | ................. | G05D 1/101 |
| 2004/0119819 A1* | 6/2004 | Aggarwal | .......... | G06K 9/00771 348/143 |
| 2006/0167597 A1* | 7/2006 | Bodin | ................. | G01C 21/005 701/3 |
| 2009/0015674 A1* | 1/2009 | Alley | ..................... | H04N 7/185 348/144 |
| 2010/0013917 A1* | 1/2010 | Hanna | ................ | G06K 9/00771 348/143 |
| 2011/0264311 A1* | 10/2011 | Lee | ........................ | H04N 7/183 701/15 |
| 2011/0320068 A1* | 12/2011 | Lee | ...................... | G05D 1/0016 701/2 |
| 2012/0016534 A1* | 1/2012 | Lee | ..................... | G05D 1/0016 701/2 |

(Continued)

*Primary Examiner* — Ian Jen
(74) *Attorney, Agent, or Firm* — Steven Reiss

(57) ABSTRACT

An unmanned aerial vehicle (UAV) detecting method is executed and applied in an UAV. The method can include creating a sample features database for a user, and storing the sample features database in a storage device; shooting a plurality of scene images from every direction around the user; capturing a plurality of features of the object from the scene image; comparing the sample features of user with the features of the object, and storing a new feature of the object different from the sample feature of user in the storage device; determining whether a tagger is around the user, and sending an alarm signal to the user.

8 Claims, 10 Drawing Sheets

(56) References Cited

U.S. PATENT DOCUMENTS

| | | | | |
|---|---|---|---|---|
| 2012/0035785 A1* | 2/2012 | Lee | G05D 1/0016 | 701/2 |
| 2012/0089274 A1* | 4/2012 | Lee | B64C 39/024 | 701/2 |
| 2012/0221176 A1* | 8/2012 | Lee | G05D 1/0033 | 701/2 |
| 2012/0221179 A1* | 8/2012 | Lee | G05D 1/0033 | 701/3 |
| 2012/0221180 A1* | 8/2012 | Lee | G05D 1/0033 | 701/3 |
| 2012/0296497 A1* | 11/2012 | Lee | G05D 1/0202 | 701/3 |
| 2012/0307042 A1* | 12/2012 | Lee | G08G 5/0069 | 348/114 |
| 2013/0034834 A1* | 2/2013 | Lee | G09B 9/48 | 434/45 |
| 2013/0073775 A1* | 3/2013 | Wade | H04N 7/181 | 710/316 |
| 2013/0162822 A1* | 6/2013 | Lee | H04N 7/185 | 348/146 |
| 2013/0173088 A1* | 7/2013 | Callou | B64C 39/024 | 701/2 |
| 2013/0176423 A1* | 7/2013 | Rischmuller | G05D 1/0038 | 348/114 |
| 2013/0253733 A1* | 9/2013 | Lee | B64C 19/00 | 701/2 |
| 2013/0287261 A1* | 10/2013 | Lee | G08G 1/0145 | 382/104 |
| 2014/0025236 A1* | 1/2014 | Levien | G05D 1/00 | 701/3 |
| 2014/0067162 A1* | 3/2014 | Paulsen | G05D 1/0038 | 701/2 |
| 2014/0140575 A1* | 5/2014 | Wolf | G06K 9/3233 | 382/103 |
| 2014/0316616 A1* | 10/2014 | Kugelmass | G05D 1/101 | 701/8 |
| 2014/0320667 A1* | 10/2014 | Densham | H04N 5/247 | 348/169 |
| 2014/0327733 A1* | 11/2014 | Wagreich | H04N 7/185 | 348/37 |
| 2014/0327770 A1* | 11/2014 | Wagreich | G05D 1/0038 | 348/148 |
| 2015/0087258 A1* | 3/2015 | Barnes | H04W 4/028 | 455/404.2 |
| 2015/0134143 A1* | 5/2015 | Willenborg | G05D 1/0094 | 701/2 |
| 2017/0032175 A1* | 2/2017 | Lee | G06K 9/0063 | |

* cited by examiner

UNMANNED AERIAL VEHICLE DETECTION METHOD AND UNMANNED AERIAL VEHICLE USING SAME

FIELD

The subject matter herein generally relates to an unmanned aerial vehicle control method and an unmanned aerial vehicle.

BACKGROUND

Current protection devices are centered around passive monitoring of individuals. For example, cameras are installed at fixed locations. The cameras have a given field of view based on the camera and instillation configuration.

BRIEF DESCRIPTION OF THE DRAWINGS

Implementations of the present technology will now be described, by way of example only, with reference to the attached figures.

DETAILED DESCRIPTION

Figure 1:
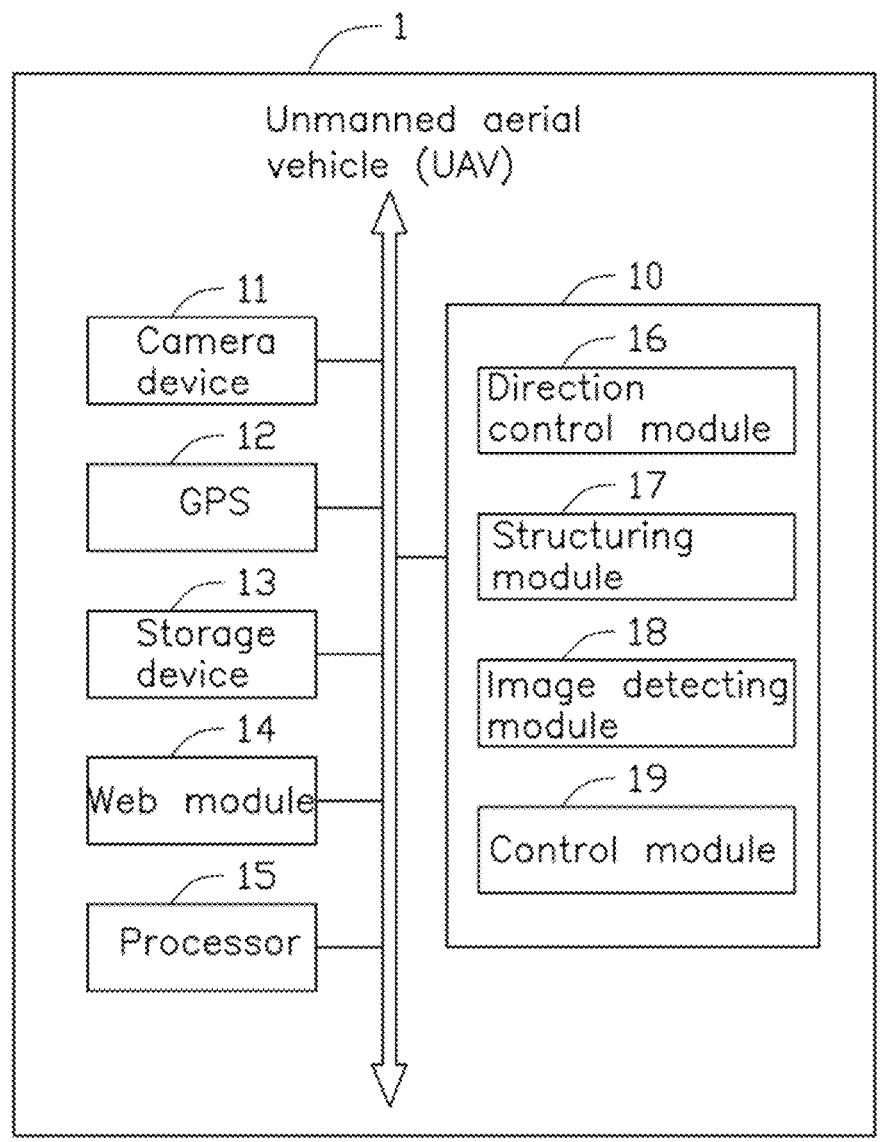
FIG. 1 is a block diagram of one embodiment of an unmanned aerial vehicle (UAV) including an UAV detecting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The disclosure will now be described in relation to an electronic device with an unmanned aerial vehicle detection method and the unmanned aerial vehicle.

Figure 2:
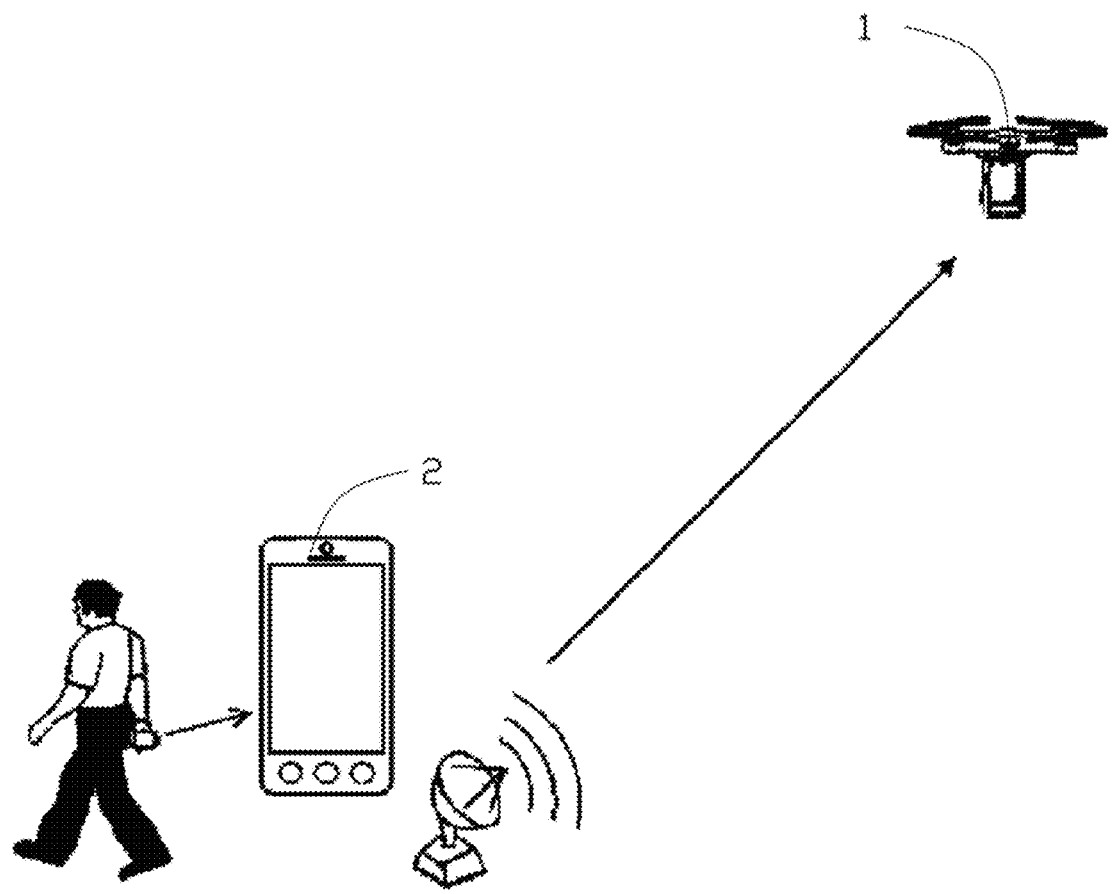
FIG. 2 is a diagrammatic view illustrating the UAV and a use taking a handheld device.

FIG. 1 illustrates a diagram of an exemplary embodiment of an unmanned aerial vehicle (UAV) system 10. The UAV system 10 is applied in a UAV 1. The UAV 1 can include, but not limited to, a camera device 11, a global position system (GPS) 12, a storage device 13, a web module 14, and a processor 15. The UAV 1 can communicate with a handheld device 2 which having GPS and web module and carried by a user moving as illustrated in FIG. 2, to acquire position information of the user through the web module 14. In at least one embodiment, the web module 14 includes at least one antenna to send and receive signal.

The UAV system 10 includes a direction control module 16, a structuring module 17, a image detecting module 18, and a controlling module 19. In one embodiment, the UAV detecting system 10 may include computerized instructions in the form of one or more programs that are stored in the storage device 13 and executed by the processor 15. It should be understood that FIG. 1 illustrates only one example of the computing device 1 that may include more or fewer components than illustrated, or have a different configuration of the various components in other embodiments.

Figure 3:
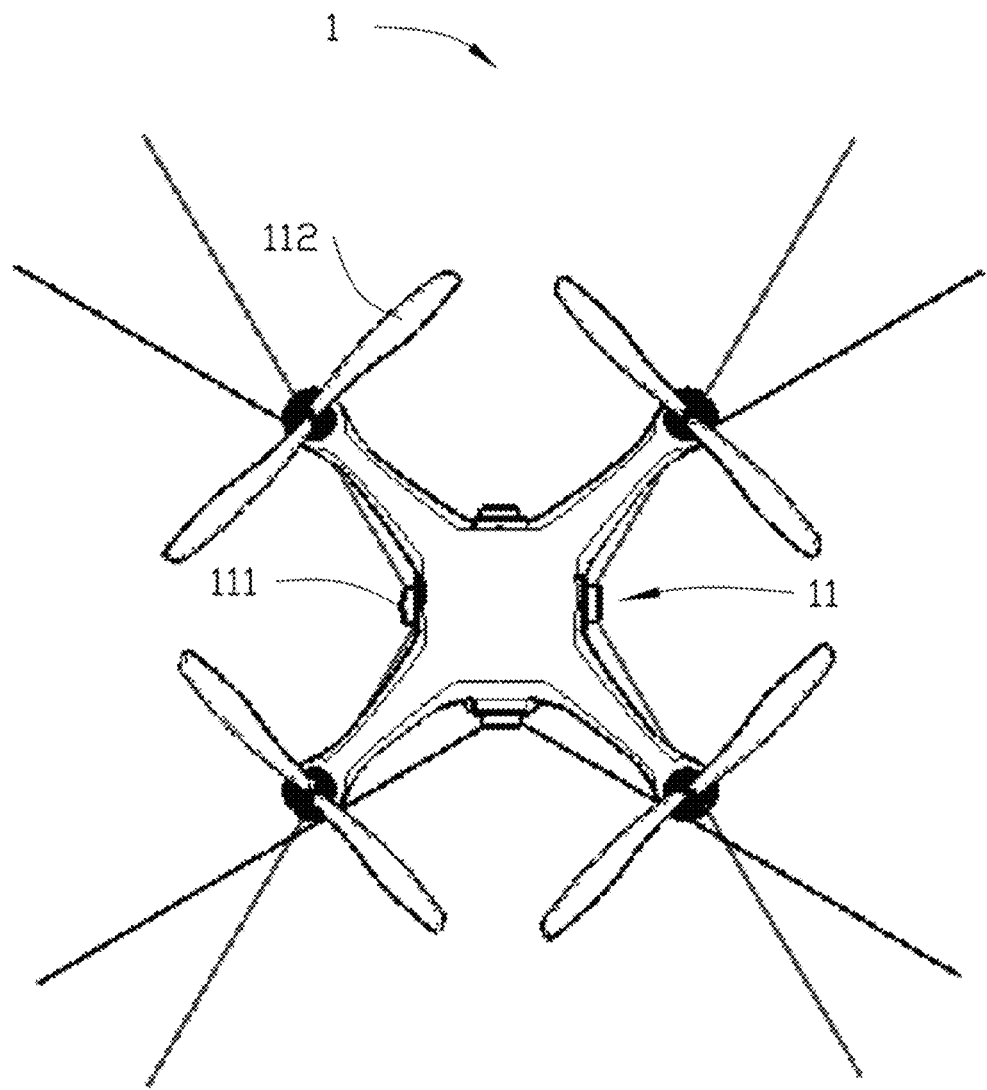
FIG. 3 is a diagrammatic view illustrating the UAV.
Figure 4:
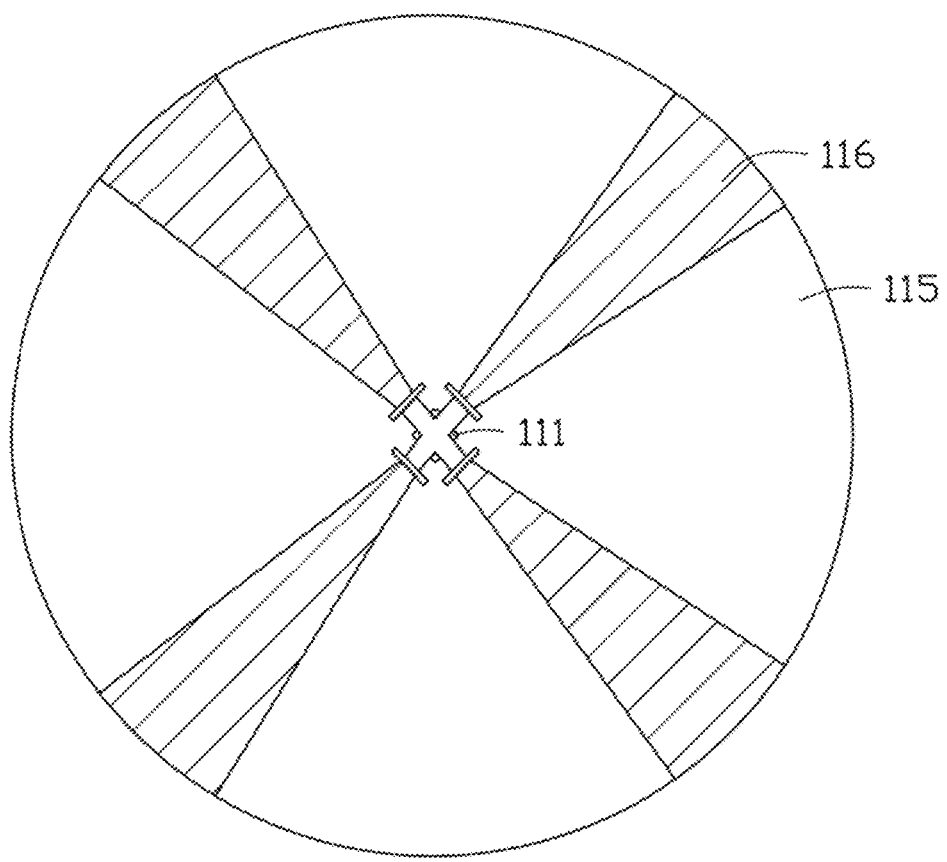
FIG. 4 is a diagrammatic view illustrating a scene image scope shot by the camera device.

The UAV 1 can fly in the space above the user. The camera device 11 includes four depth-sensing cameras 111 and four rotors 112 driving the UAV 1 to fly as illustrated in FIG. 3. The four depth-sensing cameras 111 are respectively mounted on four corners facing four directions. Each depth-sensing camera 111 shoots a corresponding scene image 115 as illustrated in FIG. 4. Two adjacent images 115 shot by two adjacent depth-sensing cameras 111 have a part of overlap 116.

The direction control module 16 acquires positions of the user through the GPS 12, and detects the flight direction of the UAV 1 from the electronic compass built-in the UAV, to compute a relative position of user and the UAV 1, which can adjust the flight direction of the UAV 1 according to the relative position. The structuring module 17 creates a sample feature database (such as clothes, figure, sex, hair style) for a user, and stores the sample features of sample features database in the storage device 13.

Figure 5:
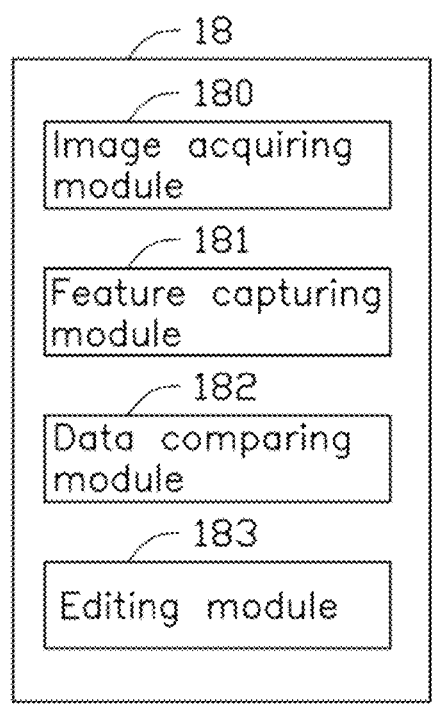
FIG. 5 is a block diagram of one embodiment of an image detecting module of the UAV.

FIG. 5 is a block diagram of one embodiment of the image detecting module 18 of the UAV 1. The image detecting module 18 includes an image acquiring module 180, a feature capturing module 181, a comparing module 182, and an editing module 183. The image acquiring module 180 is configured to obtain scene image around the user from the camera device 11. The feature acquire module 181 is configured to distinguish features of the objects appearing in the scene image. The comparing module 182 is configured to compare the sample features of user with the feature of the object. The editing module 183 is configured to number the features of the object. If the comparing module 182 distinguishes the features of object is different from the sample features, the editing module 183 numbers a new number for the object image, and stores the features of object in the storage device 13. In the embodiment, the features of object image includes features of human image and features of cars and license plate number.

Figure 6:
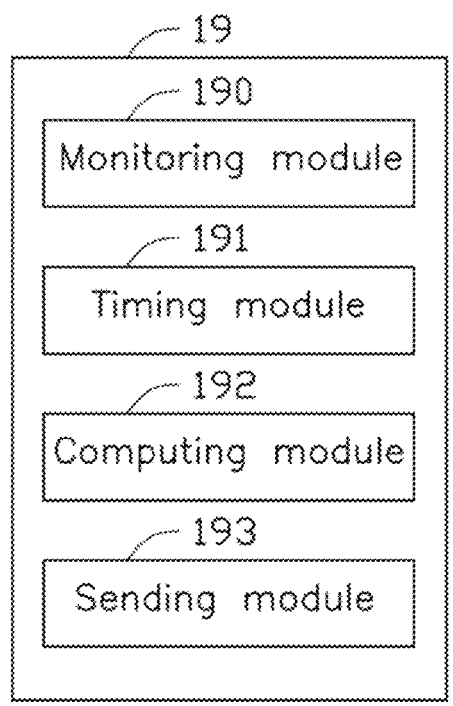
FIG. 6 is a block diagram of one embodiment of an control module of the UAV.

FIG. 6 is a block diagram of one embodiment of the control module of the UAV 1. The control module 19 includes a monitoring module 190, a timing module 191, a computing module 192, and a sending module 193. The monitoring module 190 is configured to detect whether the features of the object have appeared again in a preset period time such as 5 minutes, if not, the monitoring module 190 can control the features of object to be eliminated from the storage device 13, to release storage space and resource of the storage device 13.

The timing module 191 is configured to compute whether a storage time of features of object stored in the storage device exceeds an alarm time, such as 30 minutes. If the storage time of features of object stored in the storage device exceeds the alarm time, the computing module 192 computes whether a size change of the features of the object in the scene image exceeds a preset percent value, such as 20%. If the size change of features of the object does not exceed the preset percent value, the object is confirmed to be a tagger. The sending module 193 sends an alarm signal to the handheld device 2 through the web module 14.

Figure 7:
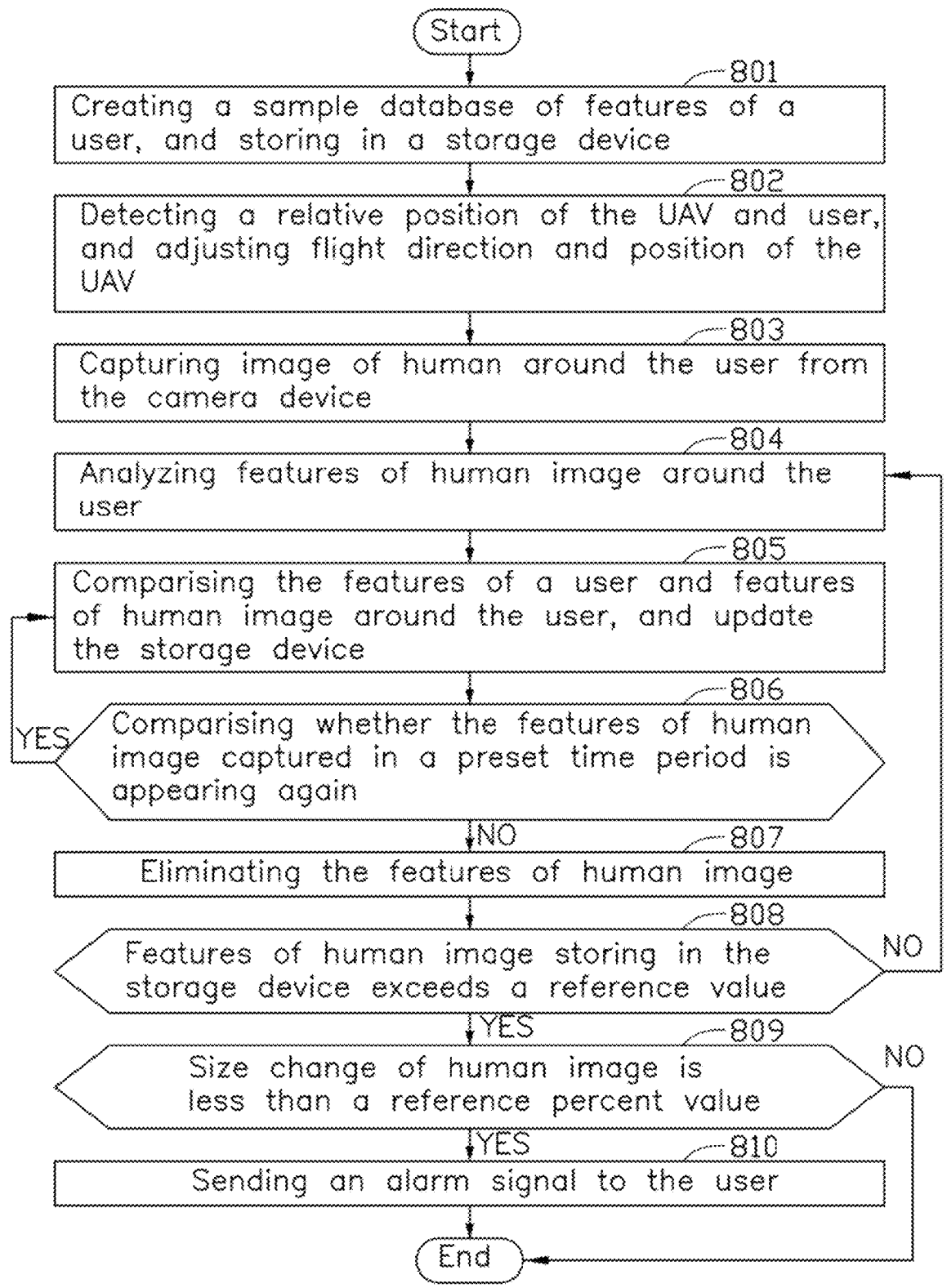
FIG. 7 is a flowchart of one embodiment of a method for detecting a tagger around the user by the UAV of FIG. 1.

Referring to FIG. 7, a flowchart is presented in accordance with an example embodiment of an UAV detecting system which is being thus illustrated. The example method is provided by way of example, as there are a variety of ways to carry out the method. The method described below can be carried out using the configurations illustrated in FIG. 1, for example, and various elements of the figure is referenced in explaining example method. Each block shown in FIG. 7 represents one or more processes, methods or subroutines, carried out in the exemplary method. Furthermore, the illustrated order of blocks is by example only and the order or fewer blocks may be utilized, without departing from this disclosure. The exemplary method can be executed by an UAV 1, and can begin at block 801.

At block 801, the structuring module 17 creates a sample feature database (such as clothes, figure, sex, hair style) for a user, and stores the sample features of sample features database in the storage device 13 with numbers.

At block 802, the direction control module 16 acquires positions of user through GPS, to determine a relative position between the UAV 1 and the user. The direction control module 16 controls the direction and position of the UAV 1 according to the relative position, to make the UAV 1 follow the user continually.

Figure 8:
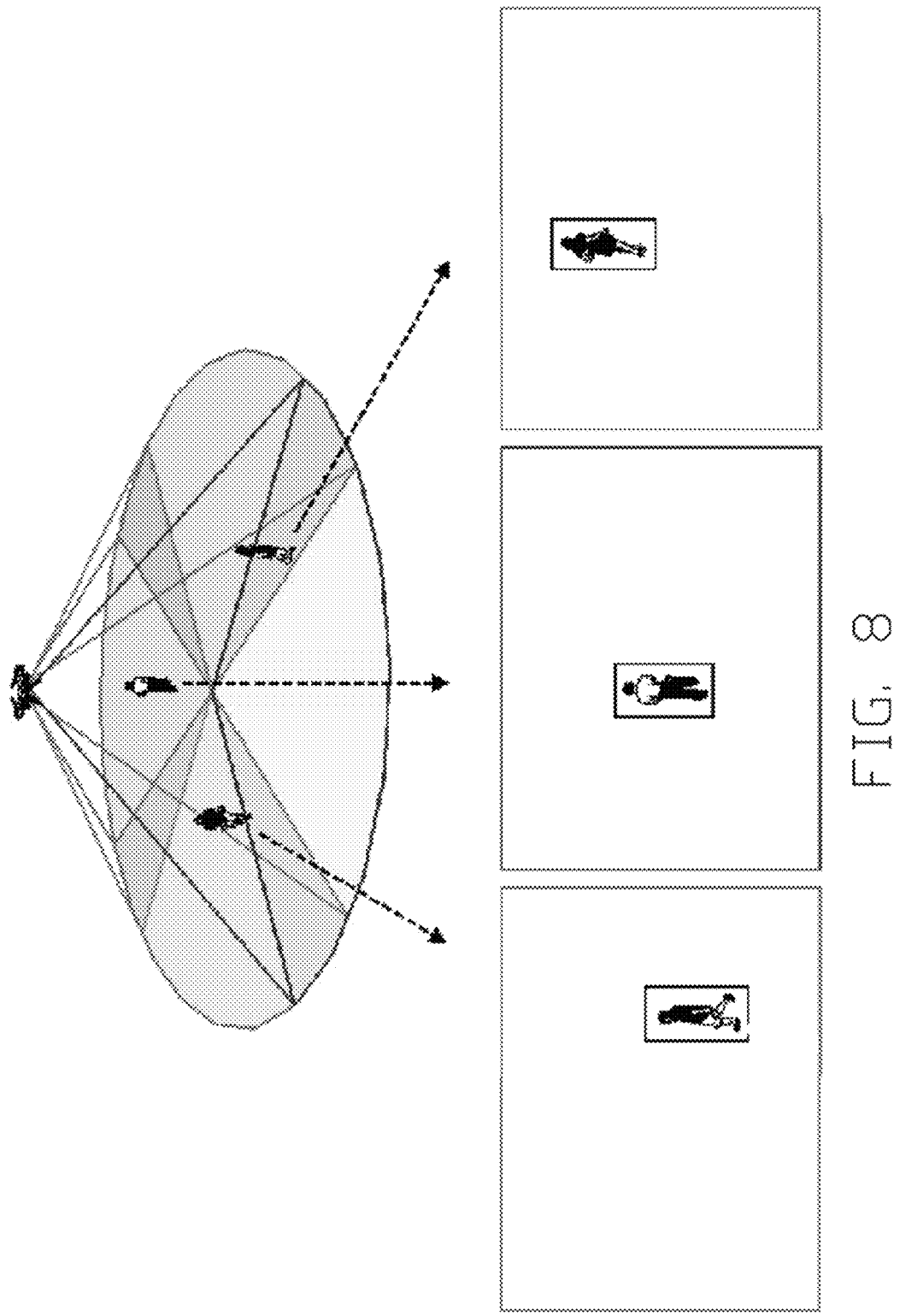
FIG. 8 is a diagrammatic view illustrating the camera device shoot the user and at least one object from the scene image around the user from every direction.

At block 803, the camera device 11 continually shoots scene image around the user in a certain scope in every direction. Referring to FIG. 8, the UAV 1 can acquire at least one object from the scene image around the user, including the user, through the camera device 11. In at least one embodiment, the at least one object can be a human, a car or a license plate.

At block 804, analyze features of human image, such as clothes, figure, sex, hair style. In at least one embodiment, the features of human image can be obtained through a technology of human detecting.

At block 805, the comparing module 182 of the image detecting module 18 compares features of user stored in the storage device 13 with the features of human image of the object. In the embodiment, if the features of human image of the object are same with the features of user stored in the storage device 13, the UAV 1 can determine the object can own a number as that of the user. If the features of human image of the object are different from the features of user stored in the storage device 13, the UAV 1 can determine the object current acquired has not been appeared in the scene image, and then the editing module 183 can give the human image a new number. The features of the human image can be stores in the storage device 13.

At block 806, monitoring module 190 determines whether the features of the object have appeared again in a preset period time, such as five (5) minutes, if the features of the object have appeared again in a preset period time, the monitoring module 190 can control the features of object to be eliminated from the storage device 13 and the process goes to block 807, otherwise, the process goes to block 805.

At block 807, the monitoring module 190 can eliminate the features and number of object in the storage device 13, to release storage space and resource of the storage device 13.

At block 808, the timing module 191 determines a storage time of the features of the object stored in the storage device 13. If the storage time of the features of the object stored in the storage device 13 exceeds an alarm time, such as 30 minutes, the processor goes to block 809, otherwise, the process goes to block 804.

Figure 9:
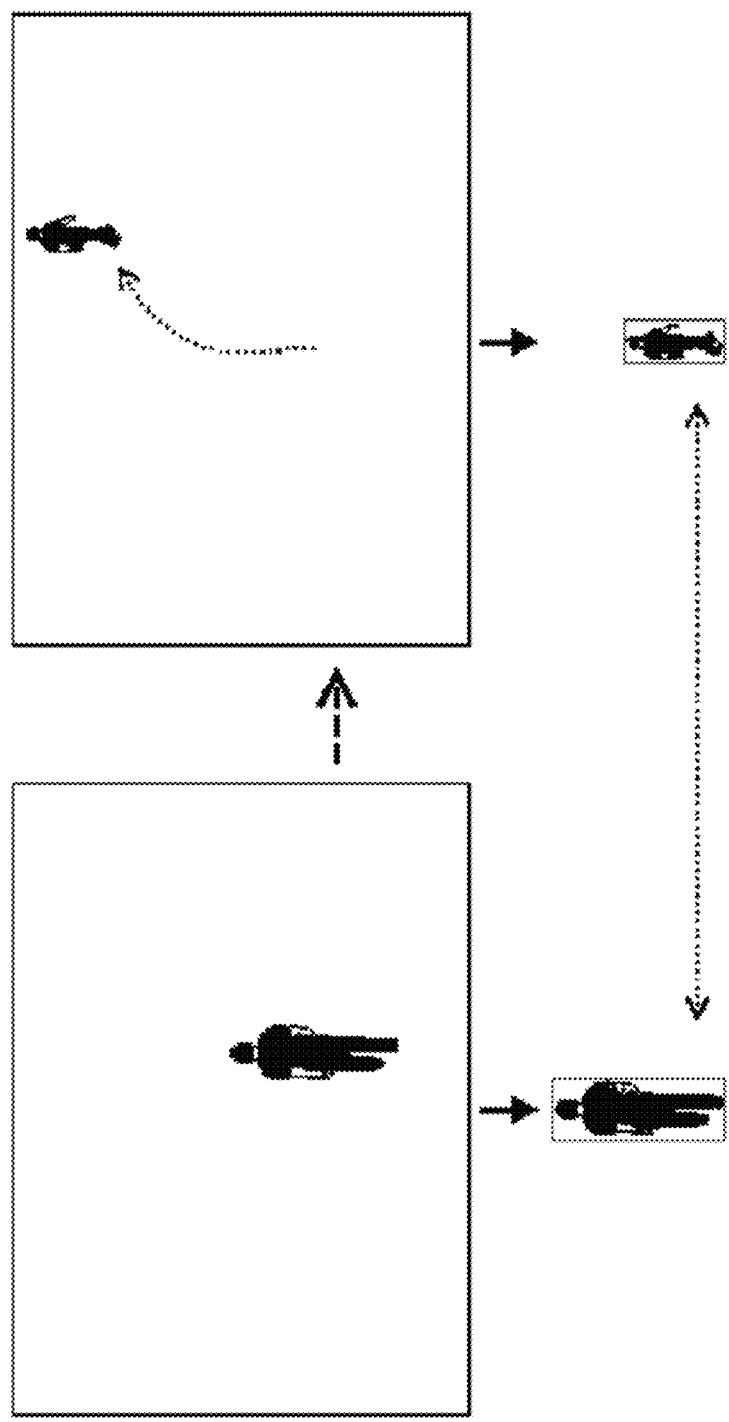
FIG. 9 is a diagrammatic view illustrating a size change of the object exceeding a preset percent value in a time period.
Figure 10:
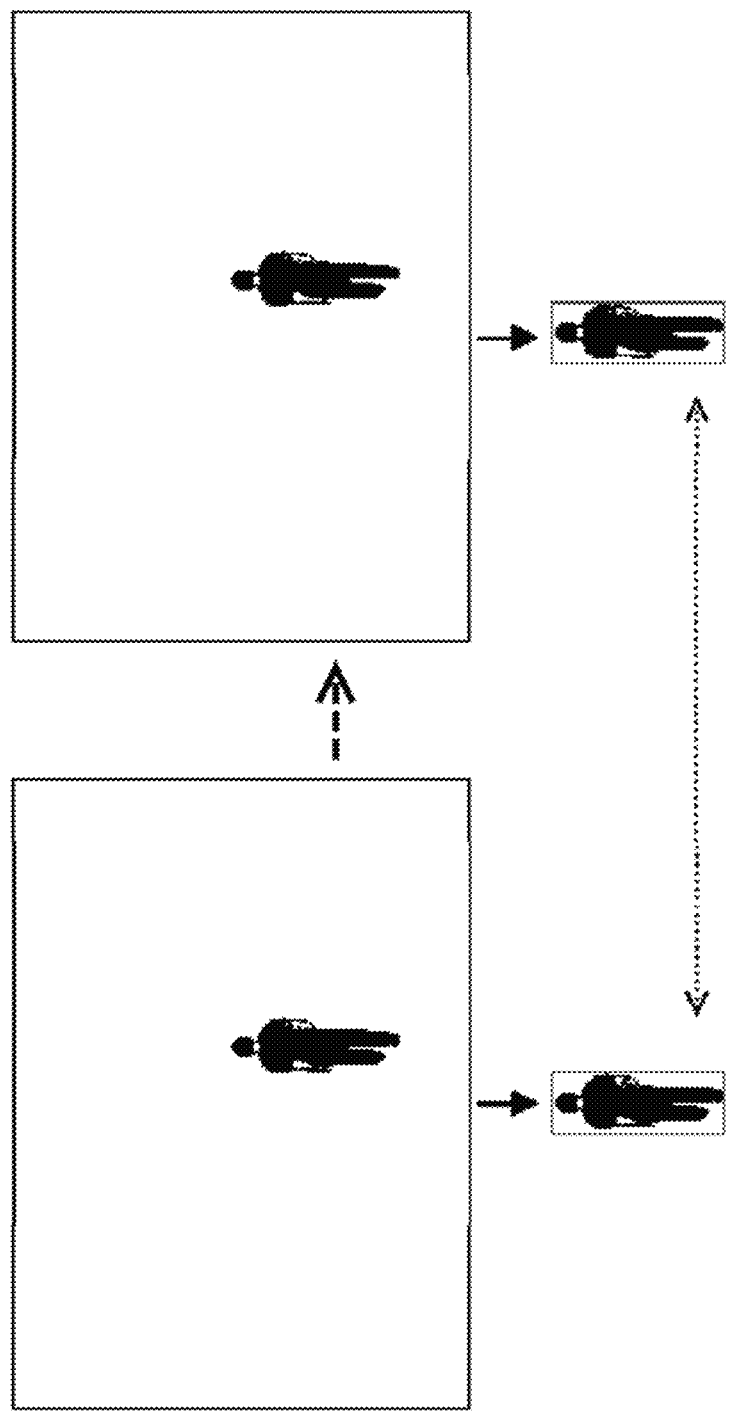
FIG. 10 is a diagrammatic view illustrating a size change of the object being less than a preset percent value in a time period.

At block 809, the computing module 19 computes a size change of the features of the object. Referring to FIG. 9, if the storage time of the features of the object in the scene image exceeds a preset percent value, such as 20%, the object may not be confirmed to be a tagger. Otherwise, referring to FIG. 10, if the features of the object in the scene image does not exceed the preset percent value, the object may be confirmed a tagger, and the process goes to block 810.

At block 810, the UAV 1 send an alarm signal to the handheld device 2 taken by the user, and the alarm signal configured to prompt the user is danger.

While the disclosure has been described by way of example and in terms of the embodiment, it is to be understood that the disclosure is not limited thereto. On the contrary, it is intended to cover various modifications and similar arrangements as would be apparent to those skilled in the art. Therefore, the range of the appended claims should be accorded the broadest interpretation so as to encompass all such modifications and similar arrangements.

What is claimed is:

1. An unmanned aerial vehicle (UAV) comprising:
   a camera device;
   at least one processor coupled to the camera device; and
   a storage device coupled to the at least one processor and stores one or more programs, the one or more programs executed by the processor, the one or more programs comprising:
      creating a sample database for reflecting a plurality of features of a user;
      storing the plurality of features of the user in the storage device;
      receiving consecutive images of a scene from the camera device;
      acquiring features of at least one object present in the consecutive images;
      storing the features of the at least one object in the storage device; and
      determining whether a size change of the object image is less than a relative percent value in a storage time, and sending an alarm signal to the user in response to the size change of the object image being less than the relative percent value in the storage time.

2. The UAV according to claim 1, wherein the one or more programs further comprising: acquiring a position of the user through global position system (GPS), and detecting a relative position of the user and the UAV according to a flight direction of the UAV, to adjust the flight direction of the UAV.

3. The UAV according to claim 1, wherein the features of the at least one object comprising features of human images which are acquired by a detection technology of human image, and features of cars images which are acquired by a detection technology of cars images.

4. The UAV according to claim 1, wherein the one or more programs further comprising: detecting whether the features of the at least one object appear again after a preset time, if not, the features of the at least one object will be eliminated.

5. A detection method operated in an unmanned aerial vehicle (UAV), the UAV comprising a camera device and a storage device, the detection method comprising:
   creating a sample features database for a user, and storing the sample features database in the storage device;
   shooting a plurality of scene images from every direction around the user;
   capturing a plurality of features of the object from the scene image;
   comparing the sample features of user with the features of the object, and storing a new feature of the object different from the sample feature of user in the storage device;
   computing whether a storage time of features of object stored in the storage device exceeding an alarm time;
   computing whether a size change of features of the object exceeds a preset percent value, when the storage time of features of object stored in the storage device exceeds the alarm time; and
   sending an alarm signal to the user in response to the size change of features of the object exceeding the preset percent value.

6. The method according to claim 5, further comprising a step of direction adjusting before shooting scene image from every direction around user, the step of direction adjusting comprising:
   obtaining a position of the user through global position system (GPS) built-in the UAV;
   detecting flight direction of the UAV through an electronic compass built-in the UAV; and
   computing a relative position of the user and the UAV, and adjusting the flight direction of the UAV.

7. The method according to claim 6, further comprising a step of eliminating after storing a new feature of the object different from the sample feature of user, the step of eliminating comprising detecting the features of object image stored in the storage device have not appeared in a preset period of time, the features of object will be eliminated.

8. The method according to claim 5, wherein the step of computing features of object from the scene image comprising:
   computing continuously scene image in real time from all aspect of the direction;
   detecting a position of an object appearing in the scene image through technology of an object detection; and
   determining features of the objects image appearing in the scene image.

* * * * *